United States Patent
Liu

(10) Patent No.: US 8,115,985 B2
(45) Date of Patent: Feb. 14, 2012

(54) 2D/3D DISPLAY DEVICE

(75) Inventor: Chun-Fu Liu, Taoyuan County (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 385 days.

(21) Appl. No.: 12/506,261

(22) Filed: Jul. 21, 2009

(65) Prior Publication Data

US 2010/0271685 A1    Oct. 28, 2010

(30) Foreign Application Priority Data

Apr. 27, 2009   (TW) .............................. 98207066 U

(51) Int. Cl.
*G02F 1/153* (2006.01)

(52) U.S. Cl. ....................................................... 359/273

(58) Field of Classification Search .................. 359/265, 359/273
See application file for complete search history.

(56) References Cited

U.S. PATENT DOCUMENTS

2006/0087499 A1* 4/2006 Chen et al. ..................... 345/204
* cited by examiner

*Primary Examiner* — Joseph P Martinez
(74) *Attorney, Agent, or Firm* — Winston Hsu; Scott Margo

(57) ABSTRACT

A 2D/3D display device is provided. The 2D/3D display device includes a flat display device and a parallax barrier panel disposed on a display surface of the flat display device. The parallax barrier panel has a barrier pattern which includes a first electrochromic material layer and a second electrochromic material layer. In a 2D display mode, the barrier pattern, the first electrochromic material layer, and the second electrochromic material layer are transparent. In a 3D stereoscopic display mode, the barrier pattern is non-transmissible. The first electrochromic material layer has a first color, and the second electrochromic material layer has a second color.

13 Claims, 5 Drawing Sheets

2D/3D DISPLAY DEVICE

BACKGROUND OF THE INVENTION

1. Field of the Invention

The present invention is related to a display device, and particularly a display device capable of providing two-dimensional (2D) images and three-dimensional (3D) images.

2. Description of the Prior Art

With a requirement to provide realistic vision, the display technology is developed to provide not only high-solution and large-size images, but also provide 3-dimensional (3D) stereoscopic display images with visual effect and on-the-spot feeling.

Prior 3D stereoscopic display technology is performed by providing two-view images, which are images divided into a left-eye image and a right-eye image and conveying to the observer's left eye and right eye. The left-eye image and the right-eye image are fused into perception of a 3D scene by observer's brain. For instance, anaglyph images are used to provide 3D images of stereoscopic effect, which are viewed with 2 color glasses (each lens a chromatically opposite color, usually red and cyan). The picture contains two differently filtered colored images, one for each eye. However, the observers have to wear the 2 color glasses and the images viewed through the 2 color glasses are color-shifted and failed to present original color of the images.

In the next generation of display technology, a 3D stereoscopic display device is developed to provide 3D stereoscopic scenes without wearing specially made glasses. In addition, the 3D stereoscopic images are presented as their original colors.

SUMMARY OF THE INVENTION

It is therefore a primary objective of the present invention is to provide a 2D/3D display device to cater to the developing tendency of the display technology.

According to the claimed invention, a 2D/3D display device is disclosed. The 2D/3D display device includes a flat display device and a parallax barrier panel disposed on a display surface of the flat display device. The parallax barrier panel includes a transparent substrate, a transparent conductive layer disposed on a surface of the transparent substrate, and a barrier pattern disposed on the transparent conductive layer. The barrier pattern has a first electrochromic material layer, a first transparent electrode, a second electrochromic material layer, and a second transparent electrode sequentially disposed on the transparent conductive layer.

The 2D/3D display panel of the present invention is compatible with current 2D display devices for image capture, image production, and image display. In addition, the 2D images displayed by the 2D/3D display panel of the present invention are presented as their original colors. The 3D stereoscopic images displayed by the 2D/3D display panel of the present invention have a perception of 3D sense.

These and other objectives of the present invention will no doubt become obvious to those of ordinary skill in the art after reading the following detailed description of the preferred embodiment that is illustrated in the various figures and drawings.

DETAILED DESCRIPTION

In the specification and the claim of the present invention may use a particular word to indicate an element, which may have diversified names named by distinct manufacturers. The present invention distinguishes the element depending on its function rather than its name. The phrase "comprising" used in the specification and the claim is to mean "is inclusive or open-ended but not exclude additional, un-recited elements or method steps." In addition, the phrase "electrically connected to" is to mean any electrical connection in a direct manner or an indirect manner. Therefore, the description of "a first device electrically connected to a second device" is to mean that the first device is connected to the second device directly or by means of connecting through other devices or methods in an indirect manner.

Figure 1:
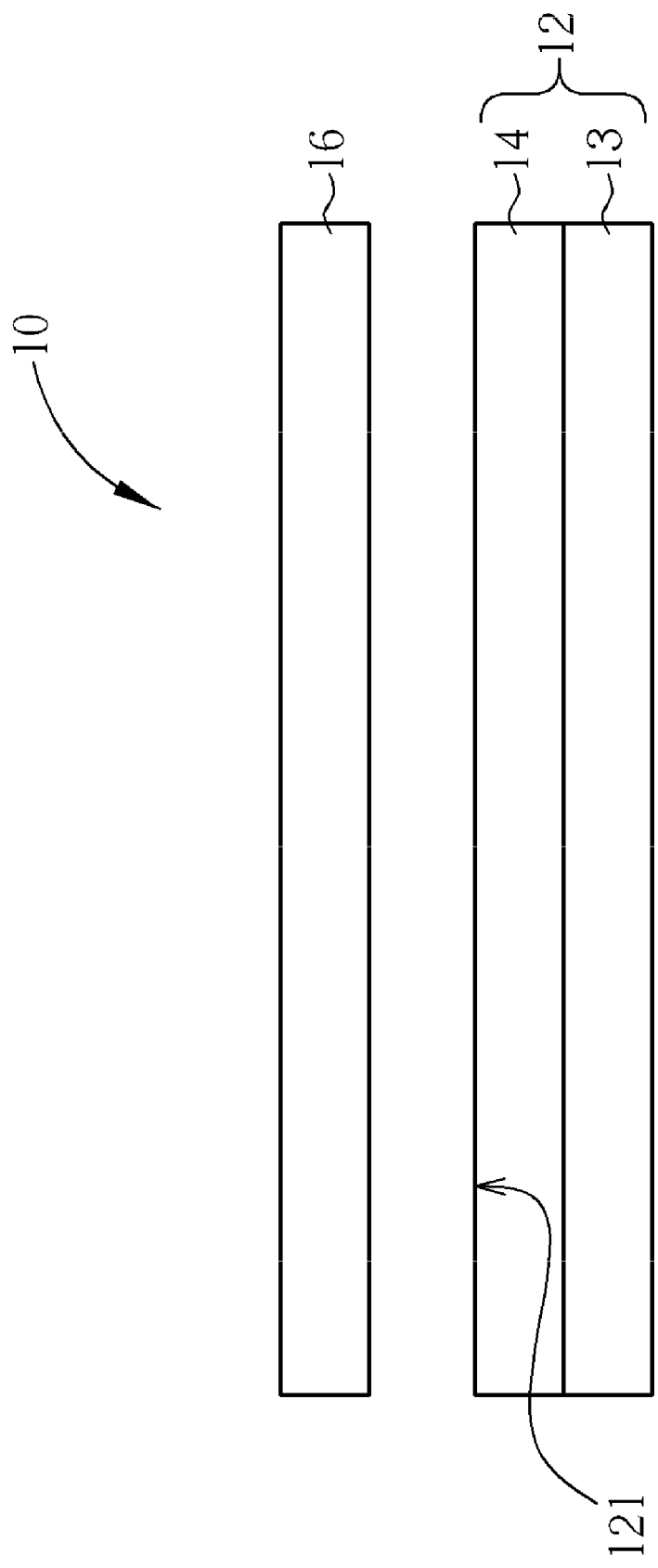
FIGS. 1-5 are schematic diagrams illustrating a 2D/3D display device according to a preferred embodiment of the present invention.

Please refer to FIGS. 1-5, which are schematic diagrams illustrating a 2D/3D display device 10 according to a preferred embodiment of the present invention. As shown in FIG. 1, the 2D/3D display device 10 includes a flat display device 12 and a parallax barrier panel 16 disposed on a display surface 121 of the flat display device 12. The parallax barrier panel 16 is electrically connected to a switching mechanism (not shown) and is controlled through a signal propagation to switch the parallax barrier panel 16 between a 2D display mode and a 3D stereoscopic display mode. The flat display device 12 may include a liquid crystal display (LCD) device, an organic light emitting diode (OLED) device, or a plasma display panel (PDP). The flat display device 12 of the present invention is a LCD device, which has a back light module 13 and an LCD panel 14 disposed on a light-emitting surface of back light module 13. The back light module 13 provides lights for the LCD panel 14, and the light source of the back light module 13 may be a cold cathode fluorescent lamp, (CCFL) or an LED. The back light module 13 further includes a light guide plate, a reflective plate, and other components known by those skilled in the art. Therefore, a description of such components will be omitted. The LCD panel 14 has an array substrate having a plurality of electrical circuits, a color filter layer, and a liquid crystal layer disposed between the array substrate and the color filter layer. The LCD panel 14 has a plurality of pixels defined by the electrical circuit disposed on the array substrate. The color filter layer includes a plurality of color filters corresponding to each of the pixels. The liquid crystal molecules of the liquid crystal layer in each pixel are controlled by the electrical circuits to determine the transmission of lights emitted by the back light module 13 through the LCD panel 14 for display a predetermined image.

Figure 2:
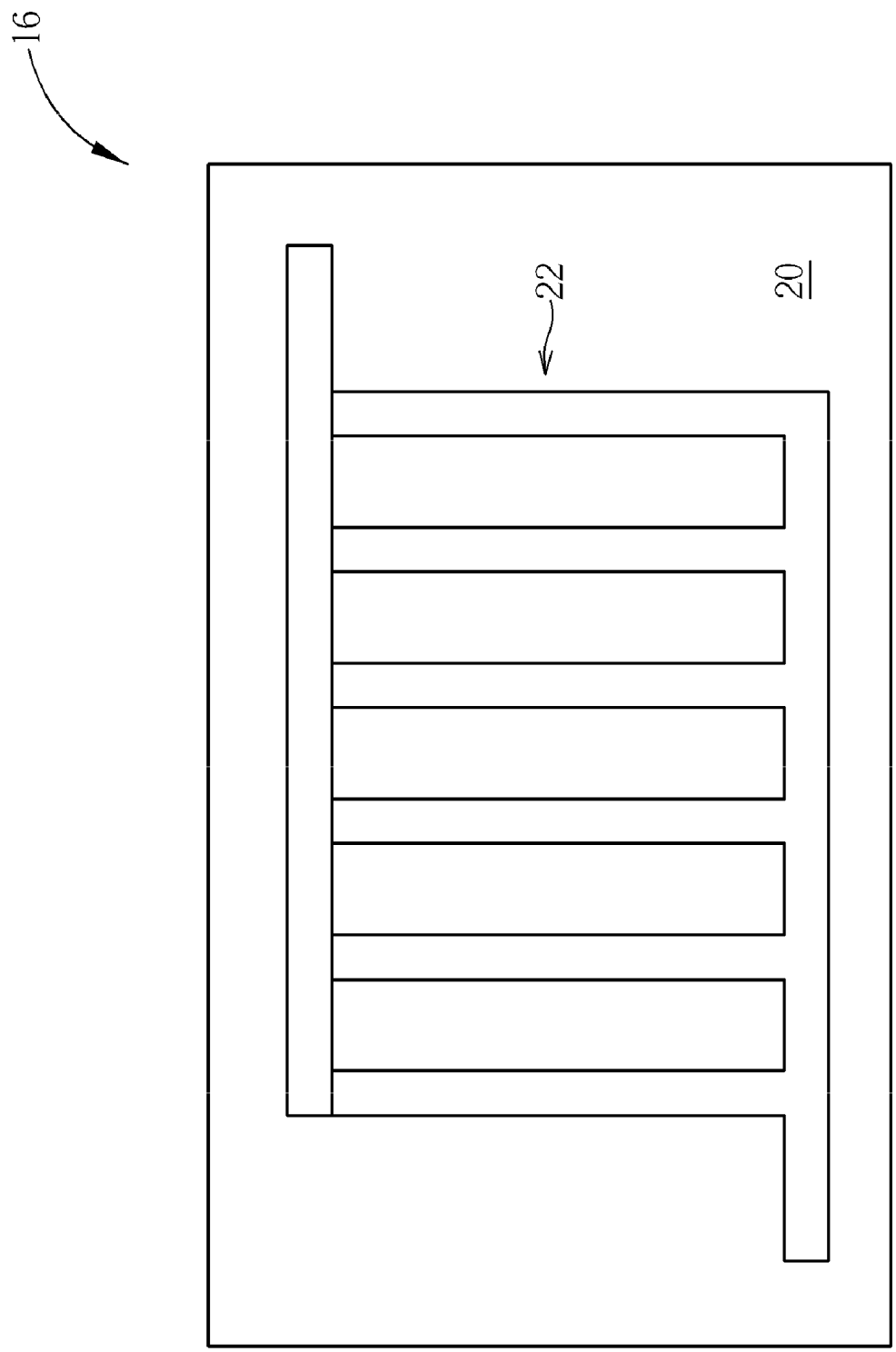
Figure 3:
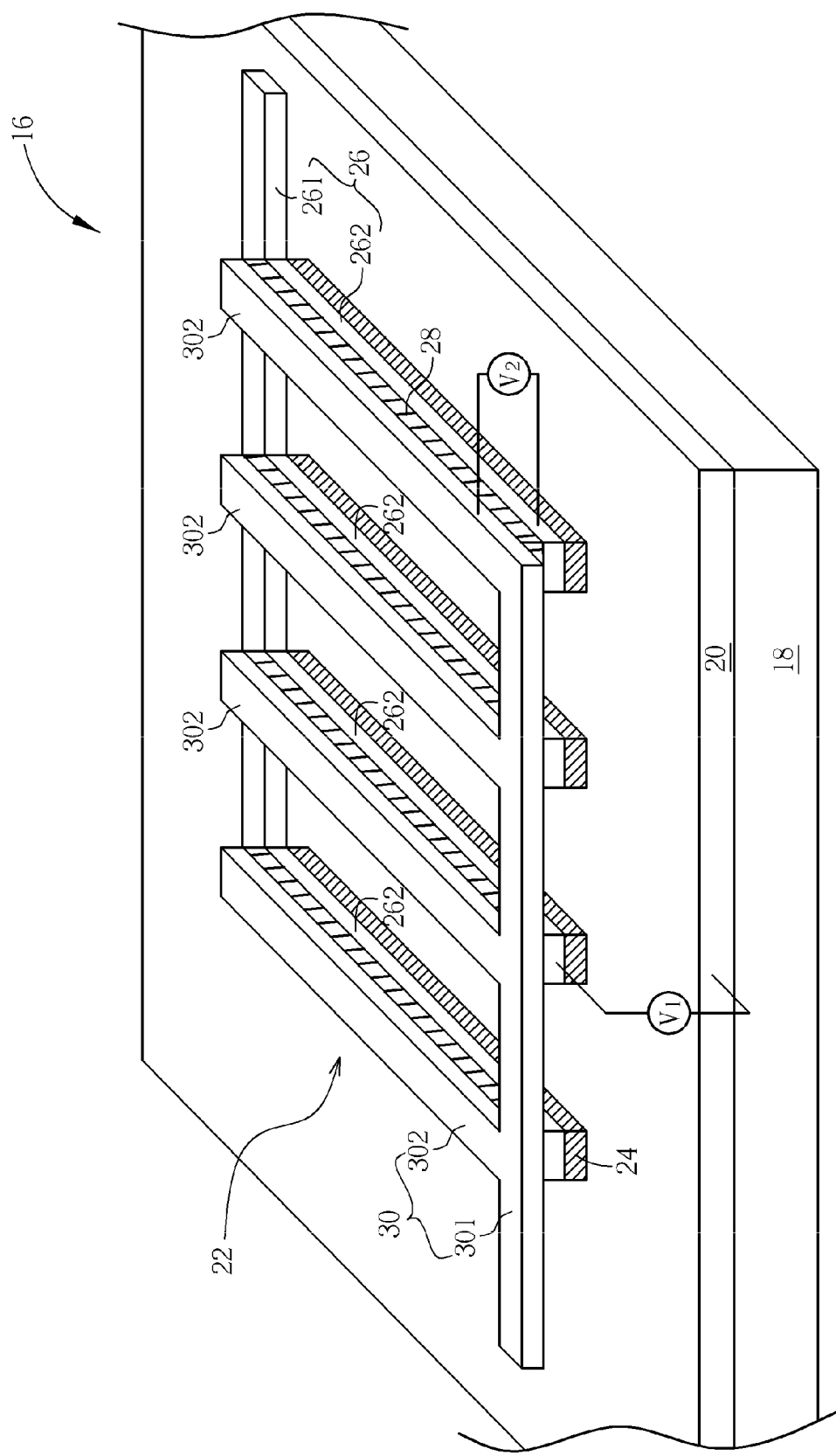

Please refer to FIG. 2 and FIG. 3, which are schematic diagrams illustrating the parallax barrier panel 16 of the present invention. FIG. 2 is a top-view diagram of the parallax barrier panel 16. Please refer to FIG. 2 in company with FIG. 3. The parallax barrier panel 16 includes a transparent substrate 18, a transparent conductive layer 20 disposed on a surface 181 of the transparent substrate 18, and a barrier pattern 22 disposed on the transparent conductive layer 20. A passivation layer (not shown) may be formed on the barrier pattern 22 to protect the barrier pattern 22. At least an insulating material layer (not shown) may be formed between the barrier pattern 22 and the transparent conductive layer 20. As shown in FIG. 3, the barrier pattern 22 has a first electrochromic material layer 24, a first transparent electrode 26, a second electrochromic material layer 28, and a second transparent electrode 30 sequentially disposed on the transparent conductive layer 20. The transparent conductive layer 20 is blankety covering on the surface 181 of the transparent substrate 18 in the present embodiment. The transparent conductive layer 20 may be defined to have a particular pattern. The first transparent electrode 26 is a comb-shaped electrode and includes a first horizontal electrode 261 and a plurality of the first vertical electrodes 262. The second transparent electrode 30 is another comb-shaped electrode and includes a second horizontal electrode 301 and a plurality of the second vertical electrodes 302. The first horizontal electrode 261 is parallel to the second horizontal electrode 301 without overlapping with each other. The first vertical electrodes 262 are overlapped with the second vertical electrodes 302 in the vertical direction. For the sake of simplification, FIG. 3 only shows the first electrochromic material layer 24, the first transparent electrode 26, the second electrochromic material layer 28, and the second transparent electrode 30, and other components are omitted. An insulating material layer may be formed between the transparent conductive layer 20 and the first transparent electrode 26, or between the first transparent electrode 26 and the second transparent electrode 30, or between the first horizontal electrode 262 and the second horizontal electrode 302. The insulating material layer not only supports the first horizontal electrode 262 or the second horizontal electrode 302 but also isolates inaccurate electrical connection between these layers from forming a short circuit.

As shown in FIG. 3, the first electrochromic material layer 24 is disposed between the transparent conductive layer 20 and the first transparent electrode 26. The second electrochromic material layer 28 is sandwiched between the first transparent electrode 26 and the second transparent electrode 30. The material of the transparent conductive layer 20, the first transparent electrode 26, and the second transparent electrode 30 may include indium tin oxide (ITO), indium zinc oxide (IZO) or other transparent material of conductivity. The first electrochromic material layer 24 and the second electrochromic material layer 28 may uses materials including polyaniline, $TiO_2$, $WO_3$, $Nb_2O_5$, $NiO_x$, or $CuO_x$. There is a principle to choose the materials of first electrochromic material layer 24 and the second electrochromic material layer 28; that is: "the candidate electrochromic materials have to be transparent when no current or voltage is applied, and to have a particular color owing to an oxidation or a reduction forced by an electron flow when a current or a voltage is applied." Therefore, the preferred material of the first electrochromic material layer 24 of the present invention is a polyaniline layer, and the preferred material of the second electrochromic material layer 28 is a $TiO_2$ layer.

Figure 4:
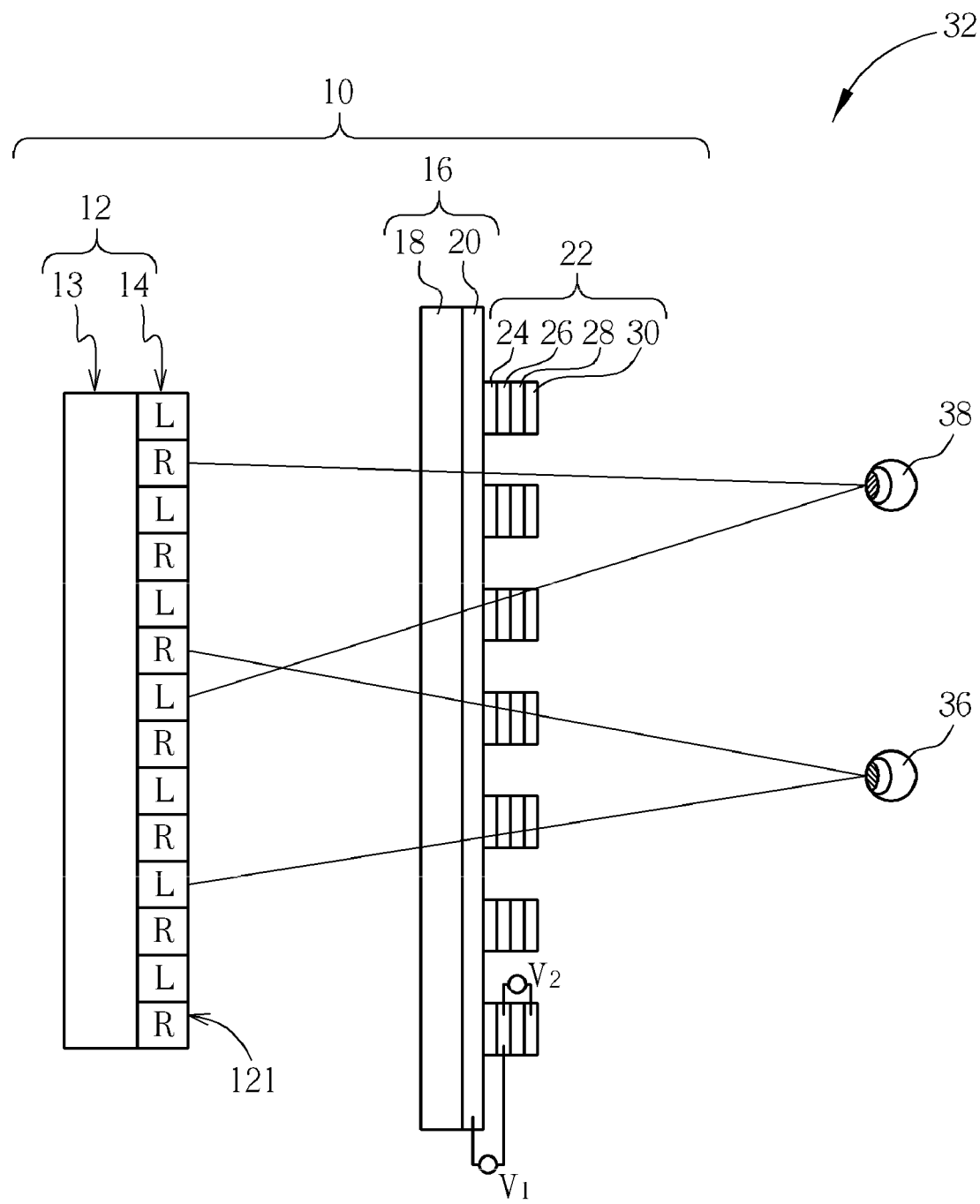

It should be noted that the 2D/3D display device 10 of the present invention may provides common 2D images. The parallax barrier panel 16 may be controlled through a signal propagation to switch the parallax barrier panel 16 between a 2D display mode 32 and a 3D stereoscopic display mode 34. As shown in FIG. 4, in the 2D display mode 32, no voltage is applied to the first electrochromic material layer 24 and the second electrochromic material layer 28, and therefore the first electrochromic material layer 24 and the second electrochromic material layer 28 are transparent and light-transmissible. Accordingly, the 2D/3D display device 10 provides common 2D images. Since the barrier pattern 22 is transparent, the 2D images displayed by the 2D/3D display device 10 are presented as their original colors without color-shifting problem.

Figure 5:
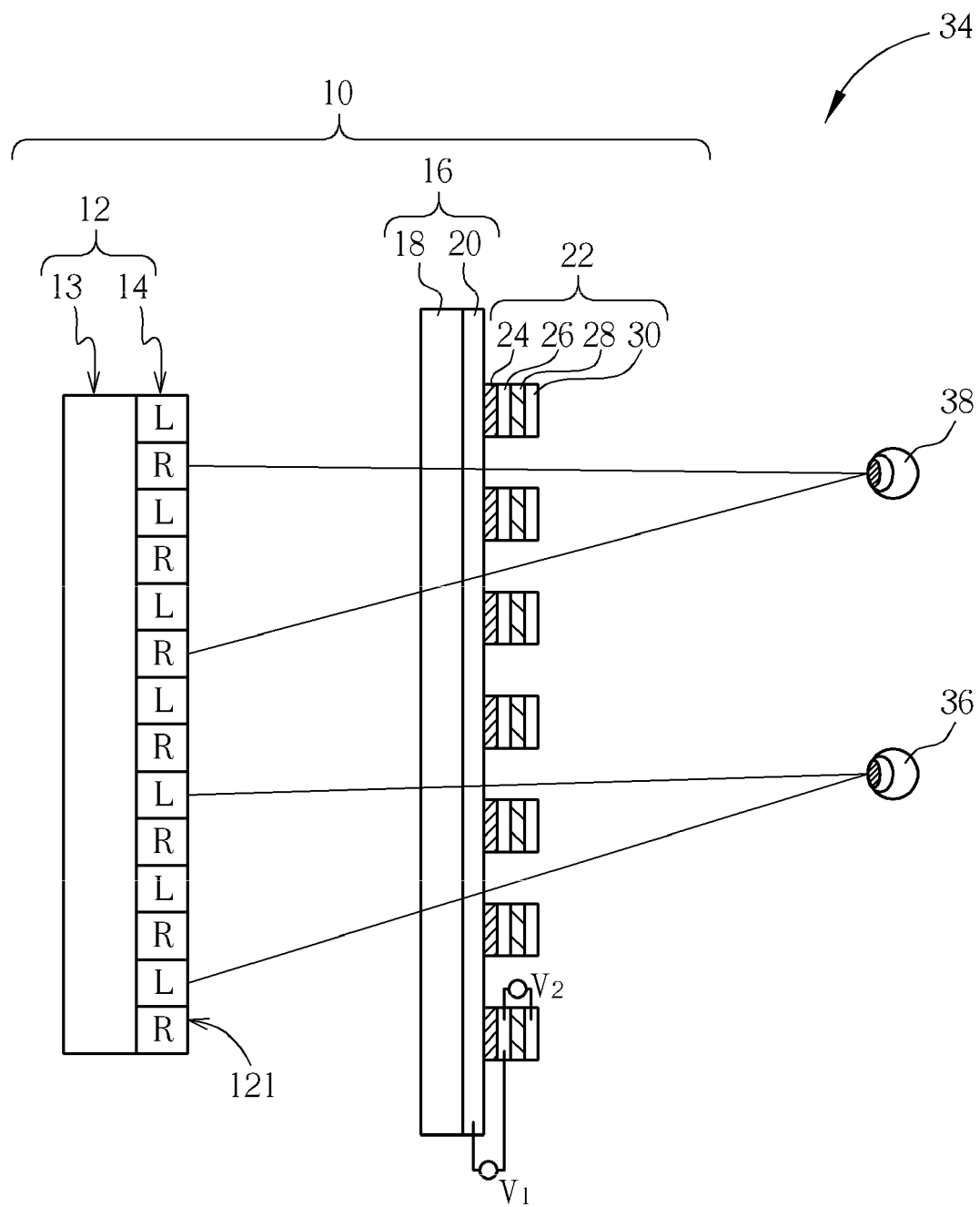

Please refer to FIG. 5, in the 3D stereoscopic display mode 34, a first voltage $V_1$ is provided by the transparent conductive layer 20 and the first transparent electrode 26 and applied to the first electrochromic material layer 24. The color of first electrochromic material layer 24 made of polyaniline is changed owing to electron flow and to have a green color. In addition, a second voltage $V_2$ is provided by the first transparent electrode 26 and the second transparent electrode 30 and applied to the second electrochromic material layer 28. The color of the second electrochromic material layer 28 is changed from transparent to blue. The first electrochromic material layer 24 and the second electrochromic material layer 28 are colored that renders the barrier pattern 22 having a opaque pattern or a black pattern in the overlapped region of the first vertical electrodes 262 and the second vertical electrodes 30 due to the color addition of the first electrochromic material layer 24 and the second electrochromic material layer 28. Therefore, the parallax barrier panel 16 is acting as a black barrier which renders the observers to view the separate images corresponding to the right eyes and the left eye respectively. In this circumstance, even if lights emitting from the display surface 121 of the LCD panel 14 or from the parallax barrier panel 16 strike the barrier pattern 22 and pass through the first electrochromic material layer 24, these lights are not allowable to pass through the second electrochromic material layer 28. Therefore, in the 3D stereoscopic display mode 34, the barrier pattern 22 has an opaque pattern in the overlapped region of the first vertical electrodes 262 and the second vertical electrodes 302. In addition, the pixels of the LCD panel 14 provide separate images, such as left eye images L for the left eye 36 and right eye images for the right eye 36. The observers view the images displayed on the 2D/3D display device 10 through the barrier pattern 22 and see the corresponding images for each eye which has a parallax and fuse these images by observer's brain into 3D stereoscopic images.

The first electrochromic material layer 24 is disposed between the transparent conductive layer 20 and the first transparent electrode 26, and the second electrochromic material layer 28 is disposed between the second transparent electrode 30 and the first transparent electrode 26, respectively. Therefore, respective voltages may be applied to the first electrochromic material layer 24 or the second electrochromic material layer 28 for coloring. The respective reverse voltages may be applied to the first electrochromic material layer 24 or the second electrochromic material layer 28 for decoloring the first electrochromic material layer 24 or the second electrochromic material layer 28 into transparent. In addition, the selection of the materials of the first electrochromic material layer 24 and the second electrochromic material layer 28 is not limited to the above-mentioned embodiment. The first electrochromic material layer 24 may uses $TiO_2$ which changes into blue in response to an application of a respective voltage, and the second electrochromic material layer 28 may uses polyaniline as material which changes into green in response to an application of a respective voltage. The materials of the first electrochromic material layer 24 and the second electrochromic material layer 28 may be selected from other electrochromic materials of various colors, and the addition of the colors has to be black or a color dark as black. The numbers of the electrochromic layers of the parallax barrier panel 16 is not limited to have two electrochromic layers illustrated in the above-mentioned embodiment. The parallax barrier panel 16 may have three or more than three layers of electrochromic material layers. In addition, an ion supply layer may be formed between the electrochromic material layer and the electrode to provide ions for oxidation/reduction of the electrochromic layer in neutral. The ion supply layer may include materials of polyethylene oxide (PEO), polyphenyleneoxide (PPO), lithium triflate, polyethylene glycol (PEG), lithium perchlorate or combinations thereof.

According to above, the 2D/3D display device of the present invention may be used to provide common 2D images. The parallax barrier panel of the 2D/3D display device may be controlled by a signal propagation and switch between a 2D display mode and a 3D stereoscopic display mode. Therefore, the parallax barrier panel is compatible with current 2D display devices for image capture, image production, and image display. When the parallax barrier panel is switched into the 3D stereoscopic display mode, 2D/3D display panel of the present invention may provide 3D stereoscopic images having a perception of 3D sense without the assistance of the specially made glasses.

Those skilled in the art will readily observe that numerous modifications and alterations of the device and method may be made while retaining the teachings of the invention.

What is claimed is:

1. A 2D/3D display device, comprising:
    a flat display device; and
    a parallax barrier panel disposed on a display surface of the flat display device, the parallax barrier panel comprising:
        a transparent substrate;
        a transparent conductive layer disposed on a surface of the transparent substrate; and
        a barrier pattern dispose on the transparent conductive layer, the barrier pattern comprising a first electrochromic material layer, a first transparent electrode, a second electrochromic material layer, and a second transparent electrode subsequently disposed on the transparent conductive layer;
    wherein the parallax barrier panel is switched between a 2D display mode and a 3D stereoscopic display mode, the barrier pattern is a transparent pattern when the parallax barrier panel is in the 2D display mode, and the first electrochromic material layer and the second electrochromic material layer are transparent when the parallax barrier panel is in the 2D display mode.

2. The 2D/3D display device of claim 1, wherein the barrier pattern is an opaque pattern when the parallax barrier panel is in the 3D stereoscopic display mode.

3. The 2D/3D display device of claim 2, wherein the first electrochromic material layer comprises a first color, and the second electrochromic material layer comprises a second color.

4. The 2D/3D display device of claim 3, wherein the first color and the second color are distinct.

5. The 2D/3D display device of claim 3, wherein the first electrochromic material layer comprises a polyaniline layer, and the first color is green.

6. The 2D/3D display device of claim 3, wherein the first electrochromic material layer comprises a $TiO_2$ layer, and the first color is blue.

7. The 2D/3D display device of claim 3, wherein the second electrochromic material layer comprises a $TiO_2$ layer, and the second color is blue.

8. The 2D/3D display device of claim 3, wherein the second electrochromic material layer comprises a polyaniline layer and the second color is green.

9. The 2D/3D display device of claim 1, wherein the first transparent electrode comprises a comb-shaped electrode comprising a first horizontal electrode and a plurality of first vertical electrodes.

10. The 2D/3D display device of claim 9, wherein the second transparent electrode comprises another comb-shaped electrode comprising a second horizontal electrode and a plurality of second vertical electrodes.

11. The 2D/3D display device of claim 10, wherein the first horizontal electrode is paralleled to the second horizontal electrode, and the first horizontal electrode does not overlap with the second horizontal electrode.

12. The 2D/3D display device of claim 10, wherein the first vertical electrodes and the second vertical electrodes are vertically overlapped.

13. The 2D/3D display device of claim 1, wherein the flat display device comprises a liquid crystal display device.

* * * * *